United States Patent

[11] 3,538,946

| [72] | Inventor | George W. Hilsheimer |
| | | P.O. Box 1647, Tulsa, Oklahoma 74101 |
| [21] | Appl. No. | 673,878 |
| [22] | Filed | Oct. 9, 1967 |
| [45] | Patented | Nov. 10, 1970 |

[54] CHECK VALVE
7 Claims, 7 Drawing Figs.

[52] U.S. Cl. ............................................. 137/512.1,
137/512.5, 137/515.5
[51] Int. Cl. ..................................................... F16k 15/03
[50] Field of Search............................................ 137/512.1,
512.5, 515.5, 515.3, 515.7, 375, 454.2; 251/306,
361, 152, 317; 267/1(MC)

[56] References Cited
UNITED STATES PATENTS

| 1,947,257 | 2/1934 | Fritz | 251/361 |
| 2,527,604 | 10/1950 | Walk | 267/1MC |
| 2,877,792 | 3/1959 | Tybus | 137/512.1 |
| 2,930,574 | 3/1960 | Sebardt | 251/306 |
| 3,023,771 | 3/1962 | Hinds | 137/512.1 |
| 3,118,465 | 1/1964 | Scaramucci | 137/454.2 |

*Primary Examiner*—Robert G. Nilson
*Attorney*—William S. Dorman

ABSTRACT: A quick-acting check valve comprising an insert member having a divided closure member hingedly secured therein, said insert member being adapted for disposition within a body in coaxial alignment therewith and secured therein in such a manner that the insert floats within the body. In addition, the exposed surfaces of the insert are coated with a molded elastomeric material to prevent corrosion and reduce damage from abrasion. This permits the construction of this type of valve from less expensive materials.

GEORGE W. HILSHEIMER
INVENTOR.

BY
*William S. Dorman*
ATTORNEY

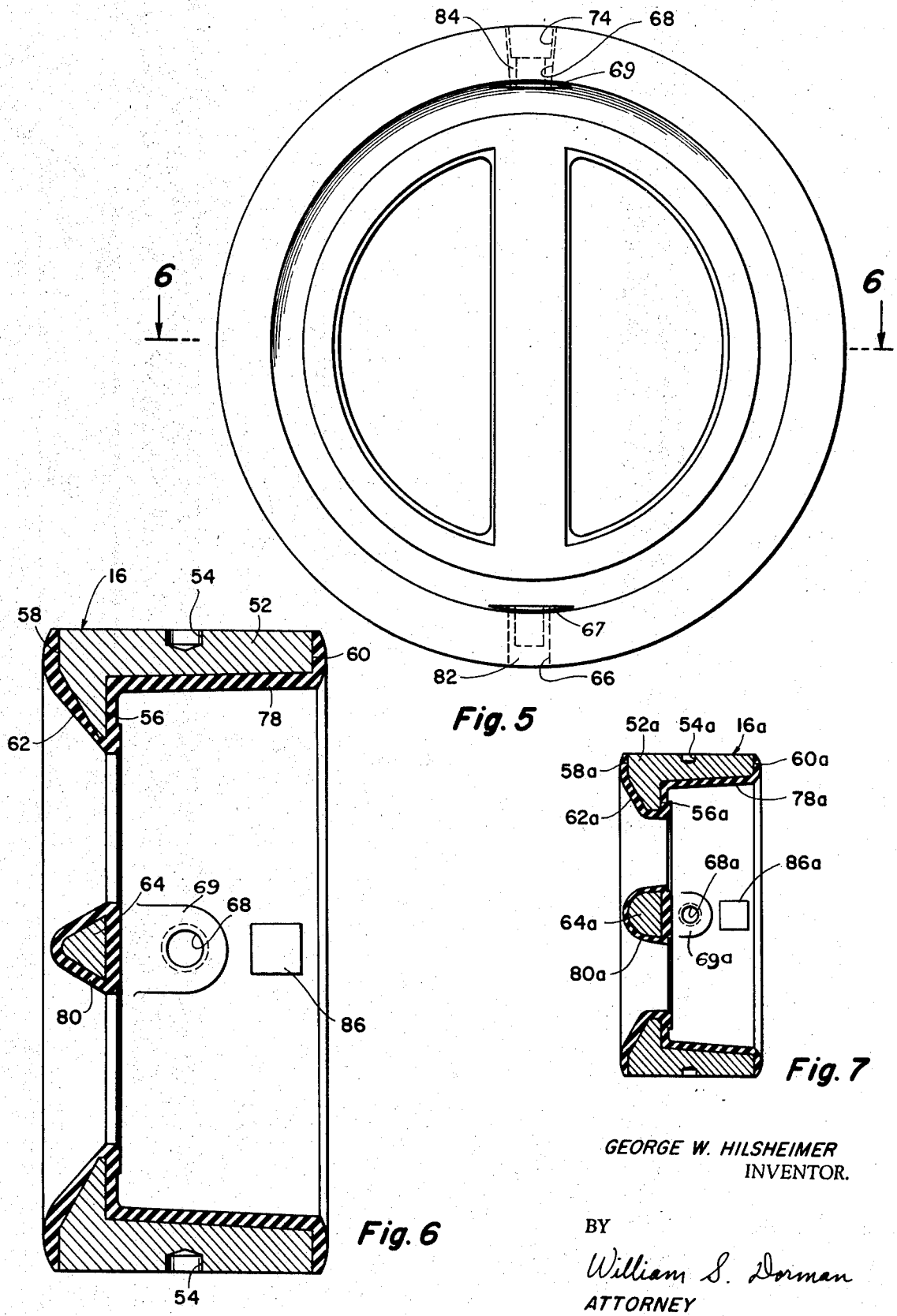

CHECK VALVE

This invention relates to improvements in valves and more particularly, but not by way of limitation, to a noncorrosive check valve having a divided closure member for quick-opening and-closing action.

Check valves of the type wherein the closure member comprises a pair of half discs having their straight sides disposed substantially adjacent each other and at a common hinge point are utilized in many flow lines wherein quick-opening and-closing of the valve is essential. These valves are frequently installed in pipe lines, and the like, wherein not only relatively high pressure conditions exist, but also corrosive fluids are transported by the line. Valves for this type use must be constructed from noncorrosive materials having sufficient strength for withstanding the pressure conditions within the line. Usually, the valves are constructed from metallic materials such as Monel Metal, and the like. Not only are these materials expensive, but in certain emergency situations, such as during wartimes, these materials are not available for the construction of valves.

The present invention contemplates a novel check valve of the divided flapper type which is not only of an improved overall operational construction, but is also provided with an insert seat member having the exposed surfaces thereof coated with a suitable noncorrosive material. Thus, the valve body and insert may be constructed from a less expensive and more available material, yet still function as a noncorrosive valve. The valve comprises an outer housing or body member adapted to be readily interposed in a pipe line, or the like. An inner insert member is secured within the body in coaxial alignment therewith and in a manner providing a floating action for the insert with respect to the body. The insert member is of a configuration complementary to the inner periphery of the body and covers the entire inner portion of the body whereby the fluid passing through the valve is in contact with the inner surfaces of the insert, and does not engage the body. Whereas the insert is constructed of a suitable metal which will withstand the working pressures, the inner or exposed surfaces of the insert are coated with a suitable elastomer material which is noncorrosive. The divided closure member is hingedly secured within the insert member, a valve seat portion is provided on the inner periphery of the insert member, and the closure member is hingedly secured within the insert for cooperation with the valve seat portion to provide an efficient sealing of the valve in the closed position thereof. In addition, the coating material on the opposed ends of the insert member provide a seal for the valve body, thus substantially precluding leakage of fluid from the valve during use. Furthermore, spring means is provided in cooperation with the hinge means for the closure member in order to facilitate the rapid closing of the valve, and to assure an efficient sealing of the valve in the closed position thereof.

It is an important object of this invention to provide a novel check valve having the inner exposed surfaces thereof provided with a noncorrosive coating.

It is another object of this invention to provide a novel noncorrosive check valve particularly designed and constructed for economy of manufacture.

A further object of this invention is to provide a novel check valve having a divided closure member adapted for a quick-closing action during operation thereof.

A still further object of this invention is to provide a novel check valve having a floating insert disposed within the valve body for increasing the efficiency of the valve.

A still further object of this invention is to provide a novel check valve which is simple and efficient in operation.

Other and further objects and advantageous features of the present invention will hereinafter more fully appear in connection with a detailed description of the drawings in which:

FIG. 5 is a plan view of a valve insert embodying the invention;

FIG. 6 is a sectional view taken on line 6–6 of FIG. 5; and

FIG. 7 is a view similar to FIG. 6 on a reduced scale and depicting a modified valve insert embodying the invention.

Figures 1, 2:
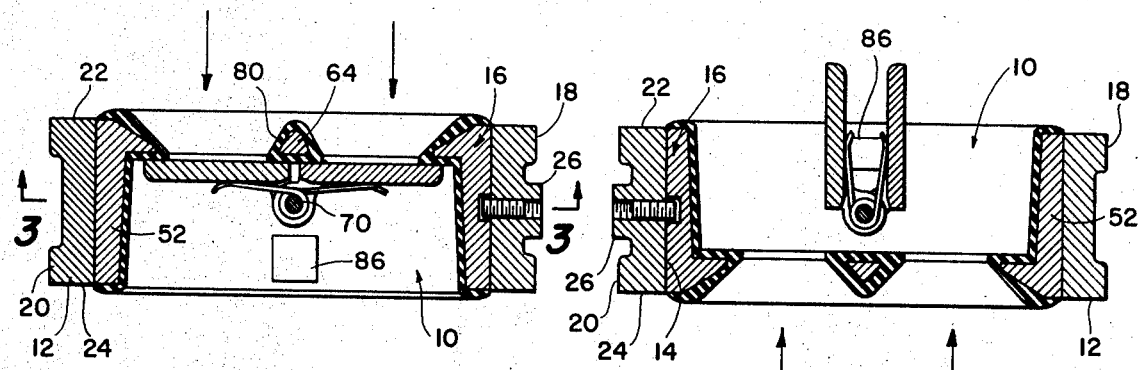
FIG. 1 is a sectional elevational view of a valve embodying the invention and depicted in a closed position.
FIG. 2 is a sectional elevational view of a valve embodying the invention and depicted in an open position.

Referring to the drawings in detail, reference character 10 generally indicates a valve comprising a substantially cylindrical outer body 12 preferably of a relatively short overall length, as particularly shown in FIGS. 1 and 2. The body 12 may be constructed from cast iron, or the like, but is not limited thereto, and with a central bore 14 extending therethrough for receiving a valve insert member 16 therein as will be hereinafter set forth in detail. An outwardly directed circumferential flange 18 is provided around the outer periphery of the body 12 at one end thereof, and a similar outwardly directed circumferential flange 20 is provided around the outer periphery of the body 12 at the opposite end thereof. The outer faces 22 and 24 of the flanges 18 and 20, respectively, are substantially flat for facilitating installation of the valve 10 in a flow line (not shown) as is well known.

Figures 3, 4:
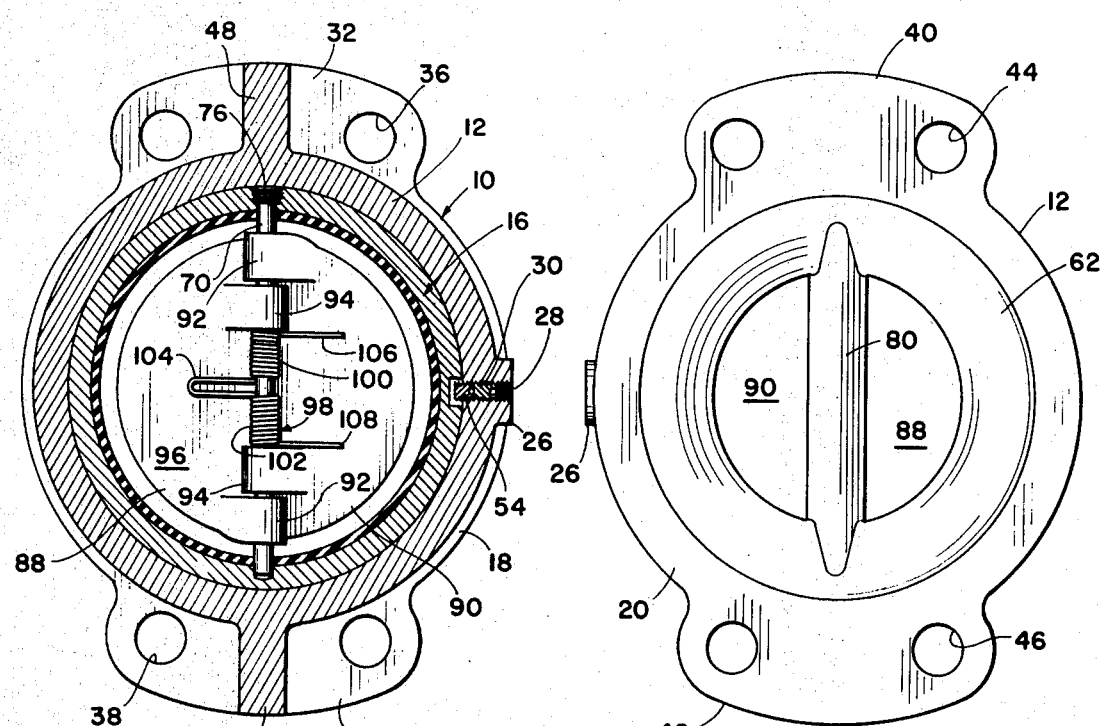
FIG. 3 is a sectional view taken on line 3–3 of FIG. 1.
FIG. 4 is a plan view of a valve embodying the invention.

The body 12 is further provided with a radially extending boss member 26 on the outer periphery thereof and substantially centrally disposed between the flanges 18 and 20. A threaded bore 28 extends through the boss 26 for receiving setscrew means 30 therein. The setscrew 30 facilitates retaining of the insert 14 within the bore 12 for a purpose as will be hereinafter set forth. Whereas two setscrews are depicted in FIG. 3, it is to be understood that a single setscrew may be utilized, or any other desired number of screws may be provided for the bore 28.

A pair of oppositely disposed radially outward extending lug members 32 and 34 are provided on the flange 18 and are provided with a plurality of spaced apertures 36 and 38, respectively. A similar pair of oppositely disposed radially outward extending lug members 40 and 42 are provided on the flange 20 and are spaced from and in substantial alignment with the lugs 32 and 34, respectively. The lugs 40 and 42 are provided with a plurality of spaced apertures 44 and 46, respectively, and the apertures 44 and 46 are in substantial alignment with the apertures 36 and 38, respectively. A pair of oppositely disposed strengthening webs 48 and 50 are provided on the outer periphery of the body 12 and are disposed between the lugs 32 and 40, and the lugs 34 and 42, respectively. The lugs and strengthening web members are cast integrally with the body 12, but are not limited thereto.

The apertures 36, 38, 44 and 46 are so arranged as to align with the stud apertures of the usual coupling flange (not shown) in a pipe line whereby the usual studs (not shown) may extend through the coupling flanges and the apertures 36, 38, 44 and 42 for securing the valve 10 in a pipe line, as will be hereinafter set forth in detail.

The insert 16 comprises a substantially cylindrical body portion 52 constructed from a suitable metal, such as ductile iron, or the like, which is relatively inexpensive. The outer diameter of the body 52 is slightly smaller than the diameter of the bore 14 in order that the insert 16 may be disposed in the bore 14. A plurality of circumferentially spaced bores or recesses 54 are provided on the outer periphery of the body 52 and are preferably centrally disposed between the opposite ends thereof for receiving the setscrew means 28 therein. The bores 54 may be either of a circular configuration, or elongated recesses, as desired, and are of a larger size than the setscrew means 28 wherein a certain amount of "play" is provided in order that the seat 16 will be movable longitudinally within the bore 14 for a purpose as will be hereinafter set forth. In addition, whereas two of the bores 54 are depicted in FIG. 6, it is to be understood that a single bore 54 may be provided, as shown in FIGS. 1, 2 and 3, or any desired number of the bores 54 may be provided.

An inwardly directed annular shoulder 56 is provided on the inner periphery of the body 52 in the proximity of one end 58 thereof to provide a seating portion for the valve 10. The end 58 of the body 52 is normally considered to be the upstream side of the valve 10 whereas the opposite end 60 of the body 52 is normally considered to be the downstream side of the valve. Thus, the end 58 is preferably beveled or tapered inwardly at 62 to provide a substantially streamlined configuration for the upstream side of the valve in order to facilitate the flow of fluid therethrough.

A crossmember 64 is provided on the body 52 and extends diametrically thereacross in the proximity of the upstream end 58. The crossmember 64 is preferably integral with the body 52, but is not limited thereto. The cross-sectional configuration of the crossmember 64 may be substantially triangular, as shown in FIGS. 1, 2 and 6, whereby the apex of the triangle extends in a direction toward the upstream side of the valve to provide a streamlined configuration therefor. The crossmember 64 cooperates with the shoulder 56 for providing a valve seat as will be hereinafter set forth in detail.

A pair of axially aligned bores 66 and 68 (FIGS. 3 and 5) are provided in the body 52 for receiving and supporting a hinge pin 70. The bores 66 and 68 are spaced slightly rearwardly, or toward the downstream side from the crossmember 64 and are preferably in alignment therewith whereby the hinge pin 70 is spaced from and substantially parallel to the crossmember 64.

The bore 68 is threaded at 74 for receiving a keeper member 76 (FIG. 3) to retain the shaft 70 in position in the bores 66 and 68. The bore 66 may extend only a relatively short distance into the body 52, as shown in FIG. 3, if desired, or the bore 66 may be similar to the bore 68 for receiving a second keeper member (not shown) therein. Alternately, the bore 66 may be plugged or closed at the outer end thereof in any suitable manner, or in the manner as will be hereinafter set forth.

The entire inner periphery or inwardly exposed surfaces of the body 52 are coated with a suitable noncorrosive, abrasion-resistant yieldable material or elastomer, such as Neoprene, Buna-N, Buna-S, Butyle, or the like. The coated surfaces include the ends 58 and 60, the beveled portion 62, and the shoulder 56, as shown at 78. In addition, the entire outer periphery of the crossmember 64 is similarly coated as shown at 80. It is also preferable to coat the inner periphery of the bore 66 and plug or close the outer end thereof with the coating material, as shown at 82 in FIG. 5, and to coat the unthreaded portion of the bore 68, as shown at 84. The coating material may be molded and bonded to the body 52 in any well-known manner (not shown).

A pair of oppositely disposed, inwardly directed stop members 86 are provided on the inner periphery of the coated body 52, and are preferably molded of the elastomer material simultaneously with the molding and bonding operation of coating of the body 52. The stop members 86 are disposed in substantial alignment with each other and cooperate to determine or establish a line which is spaced from and substantially parallel with the crossmember 64 and hinge shaft 70 for a purpose as will be hereinafter set forth.

Of course, it is preferable to provide the usual flat areas 67 and 69 on the inner periphery of the coating 78 surrounding the bores 66 and 68, respectively. The flat areas 67 and 69 provide surface adjacent the outer edges of the half discs 88 and 90 for facilitating the operation thereof, as is well known. In addition, it is to be noted that whereas the stop members 86 may be formed entirely of the elastomeric material, it may be desirable in some instances to provide a reinforced stop member having the center portion thereof metallic, and coated with the elastomeric material. In this instance, inwardly directed lug members (not shown) may be provided on the inner periphery of the body 52, and may be coated simultaneously with the coating of the body 52 as hereinbefore set forth.

A pair of substantially identical half discs 88 and 90 provide a closure member for the valve 10. The half discs 88 and 90 are preferably constructed from Monel metal, stainless steel, a reinforced epoxy, or the like, for corrosion and abrasion resistance, and since the half discs 88 and 90 are substantially identical, only the disc 88 will be set forth in detail. The half disc 88 is provided with a pair of spaced boss members 92 and 94 extending outwardly from one face 96 thereof. The bosses 92 and 94 are provided with bores (not shown) extending therethrough and in axial alignment for receiving the shaft 70 therethrough. Of course, the half disc 88 and half disc 90 are disposed on the shaft 70 in such a manner that the two half discs extend in opposite directions to provide an effective closure member for the valve.

A spring member 98 is disposed around the central portion of the shaft 70 and interposed between the spaced boss members 94 of the half discs 88 and 90, as particularly shown in FIG. 3. The spring 98 comprises a single continuous spring wire having a first portion 100 wound around the shaft 70 in one direction, and a second portion 102 wound around the shaft 70 in an opposite direction. The central portion of the spring wire is formed into an outwardly extending loop 104 which bears against the half disc 88 for constantly urging the half disc 88 into engagement with the valve seating portions 56 and 64. The opposite ends 106 and 108 of the spring wire extend in opposite directions from the loop 104 and bear against the half disc 90 for constantly urging the half disc 90 into engagement with the valve seating portions 56 and 64.

The half discs 88 and 90 are so arranged on the shaft 70 that the bosses 92 and 94 and the spring member 98 are disposed on the downstream direction and the half discs are constantly urged toward the closed position by the spring 98 as shown in FIG. 1. Of course, when sufficient fluid pressure is exerted on the half discs 88 and 90 from the upstream side thereof, the force of the spring will be overcome and the half discs 88 and 90 will pivot about the shaft 70 toward an open position, as shown in FIG. 2. When the half discs 88 and 90 approach a substantially mutually parrallel position, as depicted in FIG. 2, the faces 96 thereof will engage the stop members 86 for limiting the movement of the closure members in the opening direction. Of course, if the stop members 86 are omitted, the half discs will engage each other for limiting the opening movement thereof. However, as a practical matter it may be desirable to provide the stop members 86 for a purpose as will be hereinafter set forth.

Referring now to FIG. 7, a modified insert 16a is shown which is generally similar to the insert 16. The insert 16a comprises a body 52a corresponding to the body 52, and preferably constructed from a relatively inexpensive metallic material, such as ductile iron, or the like but not limited thereto. The body 52a is provided with a plurality of circumferentially spaced bores or recesses 54a on the outer periphery thereof similar to the bores 54 and for the same purposes. An inwardly directed annular shoulder 56a is provided on the inner periphery of the body 52a to provide a valve seat. The end 58a of the body 52a is preferably the upstream side of the insert 16a and the opposite end 60a is preferably the downstream side thereof. The upstream end 58a is preferably beveled at 62a to provide a streamlined configuration for the insert 16a, for the purposes as hereinbefore set forth for the insert 16. The interior exposed surfaces of the body 52a are coated with a suitable elastomeric material as shown at 78a and as hereinbefore set forth.

A crossmember 64a is provided in the insert 16a generally similar to the crossmember 64. However, the cross-sectional configuration of the crossmember 64a is preferably substantially semicircular in order to provide a streamlined configuration for the upstream side of the insert 16a. In addition, a pair of aligned bores 68a (only one of which is shown in FIG. 7) are provided in the insert 16a which correspond to the bores 66 and 68 in the insert 16. The usual flat areas or portions 69a may be provided around the bores 68a, as is well known. The bores 68a are disposed at a closer spacing with respect to the crossmember 64a than the bores 66 and 68 with respect to the crossmember 64. The particular arrangement and configuration of the bores 68a and crossmember 64a assure that the half discs 88 and 90 will not extend beyond the limits of the side edges of the crossmember 64a in the full open position of the valve 10, thus reducing the restriction of flow through the open valve. Of course, it is preferable to provide stop members 86a on the inner periphery of the insert 16a, said stop members 86a being similar to the stop member 86 and for the same purpose.

OPERATION

In order to install the valve 10 in a pipe line, or the like, (not shown) the valve may be inserted or interposed between a pair of the usual flanged coupling members (not shown) normally provided or utilized in pipelines. The usual studs (not shown) may be inserted through the appropriate bores in the flanged couplings, and through the bores 36, 38, 44 and 46 of the outer body 12. Tightening of the studs in the usual manner will bring the faces or ends 22 and 24 of the body 12 into engagement with the respective faces of the flanged couplings, as is well known. Of course, the opposed ends 58 and 60 of the insert 16 will also be brought into engagement with the faces of the flanged couplings, and the coating material thereon will function as a seal to preclude leakage at the joint therebetween. In addition, the floating engagement between the setscrew means 30 and the bore 54 permits the insert 16 to move axially within the bore 14 in order that the pressure on the opposed ends 58 and 60 will be equalized.

If is to be noted that whereas the axial length of the body 52 as depicted herein is substantially equal to the axial length of the body 12; as a practical matter it may be desirable that the axial length of the metallic body 52 be slightly less than the length of the body 12 in order to facilitate the installation of the valve in the pipeline.

As hereinbefore set forth, the valve 10 is preferably interposed in the pipeline (not shown) in such a manner that the end 58 is in the upstream direction and the end 60 is in the downstream direction. Thus, the flow through the valve is normally in the direction indicated by the arrows in FIGS. 1 and 2. The valve 10 is normally in a closed position as shown in FIG. 1 due to the force of the spring 98 against the half discs 88 and 90. The outer periphery of the half discs 88 and 90 engage the valve seats established by the shoulder 56 and the crossmember 64, and the coating material thereon provides an efficient seal for the half discs in the closed position of the valve.

When the pressure acting on the upstream side of the half discs 88 and 90 becomes sufficiently great for overcoming the force of the spring 98, the half discs will pivot about the shaft 70 toward the open position as shown in FIG. 2. The stop members 86 will limit the opening movement of the half discs, and preferably limit the full opening of the half discs at a position wherein the half discs are substantially parallel with each other, and in substantially parallel relationship to the axis of the valve 10. This provides a minimum of restriction for the flow of fluid through the open valve.

When the pressure action on the upstream side of the half disc falls below the force of the spring 98, the spring 98 will quickly move the half discs to the closed position against the valve seats as hereinbefore set forth. The pressure of the spring 98 maintains the half discs in an efficiently sealed position against the valve seats until the valve is opened again, thus assuring a quick action for the valve, and substantially precluding leakage of fluid in the closed position thereof.

Whereas, the half discs 88 and 90 will engage each other for limiting the pivoting thereof about the shaft 70 in the opening operation, it is to be noted that the stop members 86 limit the movement of the half discs to eliminate engagement between the half discs in the open position. This is a precaution for precluding accidental opening of the valve in back flow conditions in the event of breakage or failure of the spring 98. For example, in the event the spring 98 should break, one of the half discs may pivot about the shaft 70 into a position superimposed on the other half disc, and back flow of fluid through the valve would not or could not in any manner close the dislodge half section. Thus, the valve would remain open. This is eliminated by use of the stop members 86 since neither of the half discs may move to a superimposed position with respect to the other. Thus, each valve disc would either close, by gravity, or one or the other half discs might remain in a substantially parallel position with respect to the valve axis in the event of spring failure, and back blow of fluid through the valve will move any opened half disc to the closed position therefor.

As hereinbefore set forth, all of the interior surfaces of the valve insert 16 exposed to the flow stream moving through the valve 10 are coated with the noncorrosive, abrasion-resistant material. Thus, the valve may be constructed from relatively inexpensive metals while providing a long and efficient life for the valve.

From the foregoing it will be apparent that the present invention provides a novel check valve of the type wherein the closure member comprises a pair of complementary half disc members journaled on a pivot shaft, and having spring means for urging the half discs toward the closed position in order to provide an efficient and quick-closing action for the valve. The valve is provided with a valve insert member providing valve seats for the closure discs. The interior surfaces of the valve insert are coated with a suitable elastomeric material which not only resists corrosion and abrasion from the flow stream, but also provides a sealing action for the valve seats, and at the ends of the valve insert for precluding leakage of fluid from the closed valve, and at the joints between the valve and the pipeline in which the valve is installed. The novel valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

I claim:

1. A check valve comprising: an outer body; a valve insert disposed in the outer body and extending completely therethrough; closure means journaled in the valve insert to provide open and closed positions for the valve; valve seat means provided on the inner periphery of the valve insert for cooperation with the closure means to provide said closed position for the valve; pressure means cooperating with the closure means for constantly urging the closure means toward said closed position and to provide a quick-closing action therefor; said valve insert having a noncorrosive and abrasion-resistant coating bonded thereon to provide a prolonged useful life for the valve; said closure means comprising a pair of complementary half discs journaled on a transversely extending shaft disposed in the valve insert; said valve insert being provided with bore means for receiving the opposite ends of the shaft therein; said bore means having said noncorrosive and abrasive coating thereon; and said pressure means comprising a single spring wire carried by the shaft and engaging each half disc independently for constantly urging said half disc toward the closed position therefor.

2. A check valve as set forth in claim 1 wherein the internally exposed surfaces and end faces of said valve insert are coated with an elastomeric material to provide said noncorrosive and abrasion-resistant characteristics.

3. A check valve as set forth in claim 2 wherein said elastomeric material is bonded to the said exposed surface and end faces of the valve insert, and said elastomeric material provides a seal member for the end faces of the valve insert and for the said valve seats in the valve insert.

4. A check valve as set forth in claim 1 wherein the valve insert is axially movable with respect to the body whereby the longitudinal pressures acting on the end faces of said valve insert are equalized.

5. A check valve as set forth in claim 1 wherein yieldable stop means is provided on the inner periphery of said valve insert for limiting the opening movement of the closure means.

6. A check valve as set forth in claim 1 wherein said valve insert comprises a substantially cylindrical metallic body having an outer diameter complementary to the inner diameter of the outer body, and an elastomer material being bonded to the inner periphery and end faces and valve seat means of said valve insert to provide said noncorrosive and abrasion-resistant characteristics, said elastomer material providing a seal for the end faces and valve seat means.

7. A check valve as set forth in claim 1 wherein said single wire comprises a first portion wound around the shaft in one direction and a second portion wound around the shaft in an opposite direction, an outwardly extending loop portion interposed between the wound portions and engaging the downstream face of one half disc, and the opposite ends of said spring wire being free and extending in a direction opposite from the loop portion for engaging the downstream face of the other half disc.